United States Patent
Montazeri et al.

(10) Patent No.: US 11,619,426 B2
(45) Date of Patent: Apr. 4, 2023

(54) ADSORPTION-BASED HEAT PUMP

(71) Applicant: Enersion Inc., Toronto (CA)

(72) Inventors: Hanif Montazeri, Toronto (CA); Jingyuan Hou, Toronto (CA); Arshan Singh, Brampton (CA); Bahman Lashkari, Richmond Hill (CA); Vignesh Krishnamurthy, Toronto (CA)

(73) Assignee: Enersion Inc., Toronto (CA)

( * ) Notice: Subject to any disclaimer, the term of this patent is extended or adjusted under 35 U.S.C. 154(b) by 5 days.

(21) Appl. No.: 16/976,606

(22) PCT Filed: Mar. 7, 2019

(86) PCT No.: PCT/CA2019/050278
§ 371 (c)(1),
(2) Date: Aug. 28, 2020

(87) PCT Pub. No.: WO2019/169497
PCT Pub. Date: Sep. 12, 2019

(65) Prior Publication Data
US 2021/0048232 A1    Feb. 18, 2021

Related U.S. Application Data

(60) Provisional application No. 62/639,843, filed on Mar. 7, 2018.

(51) Int. Cl.
*F25B 30/04*    (2006.01)
*F25B 17/08*    (2006.01)
(Continued)

(52) U.S. Cl.
CPC .............. *F25B 30/04* (2013.01); *F25B 17/08* (2013.01); *F25B 39/026* (2013.01); *F25B 37/00* (2013.01); *F25B 2315/005* (2013.01)

(58) Field of Classification Search
CPC .. F25B 17/08; F25B 39/026; F25B 2315/005; F25B 37/00; F25B 30/04; F25B 17/083;
(Continued)

(56) References Cited

U.S. PATENT DOCUMENTS

| 4,881,376 A | * | 11/1989 | Yonezawa | ............. F25B 39/026 62/480 |
| 7,251,955 B2 | | 8/2007 | Henning | |
| 2018/0347867 A1 | * | 12/2018 | Lai | .......................... F01K 25/08 |

FOREIGN PATENT DOCUMENTS

| CA | 3030589 A1 | 7/2017 |
| CN | 1206457 A | 1/1999 |

(Continued)

OTHER PUBLICATIONS

International Search Report and Written Opinion dated Jun. 12, 2019 for International Patent Application No. PCT/CA2019/050278, 8 pages.

(Continued)

*Primary Examiner* — Frantz F Jules
*Assistant Examiner* — Webeshet Mengesha
(74) *Attorney, Agent, or Firm* — Morgan, Lewis & Bockius LLP

(57) ABSTRACT

Disclosed is an adsorption-based heat pump useful for refrigeration and cooling/heating for applications such as HVACs and chillers. Adsorption is a surface phenomenon where a solid substance (adsorbent) attracts molecules of a gas or solution (refrigerant or adsorbate) on its surface. The latent heat of the adsorbate provides the heating/cooling effect. The novel adsorption heat pump enhances heat and/or mass transfer to and from the adsorbate. One embodiment comprises at least one evaporator, at least one desorber (adsorbent heating apparatus), at least one adsorbent cooling apparatus and at least one condenser. The embodiment (Continued)

employs different techniques to enhance heat and/or mass transfer.

7 Claims, 14 Drawing Sheets

(51) Int. Cl.
*F25B 39/02* (2006.01)
*F25B 37/00* (2006.01)

(58) Field of Classification Search
CPC .......... F25B 15/00–17/12; Y02B 30/27; Y02B 30/62; Y02B 30/00
See application file for complete search history.

(56) References Cited

FOREIGN PATENT DOCUMENTS

| | | | |
|---|---|---|---|
| CN | 1798952 | A | 7/2006 |
| CN | 103043736 | A | 4/2013 |
| CN | 105174330 | A | 12/2015 |
| EP | 0702199 | A1 | 11/1998 |
| EP | 2456719 | B1 | 1/2017 |
| JP | 0203169 | A | 8/1990 |
| JP | 003199864 | A | 8/1991 |
| JP | H02203169 | A * | 8/1992 |
| JP | 006058643 | A | 3/1994 |
| JP | H0658643 | A * | 3/1994 |
| JP | 008159597 | A | 6/1996 |
| JP | H08159597 | * | 6/1996 |
| JP | H08159597 | A | 6/1996 |
| JP | H08240357 | A | 9/1996 |
| JP | 2010043804 | A | 2/2010 |
| JP | 2017508121 | A | 3/2017 |
| WO | 2006135026 | A1 | 12/2006 |
| WO | 2009157875 | A1 | 12/2009 |
| WO | 2011010205 | A1 | 1/2011 |
| WO | 2015104719 | A2 | 7/2015 |

OTHER PUBLICATIONS

International Preliminary Report on Patentability for International Patent Application No. PCT/CA2019/050278, 4 pages.
Chinese Office Action dated Aug. 27, 2021 for Chinese Patent Application No. 201980016980.5, 8 pages.
Extended European Search Report dated Jun. 11, 2021, for European Patent Application No. 19763305, 10 pages.
Indian Office Action dated Aug. 20, 2021 for Indian Patent Application No. 202027038949, 6 pages.
Japanese Office Action for corresponding Application No. 2020-570605 dated Feb. 21, 2022, 16 pages.

* cited by examiner

ADSORPTION-BASED HEAT PUMP

CROSS REFERENCE TO RELATED APPLICATIONS

This application is a US National Phase of International Application No. PCT/CA2019/050278 filed on Mar. 7, 2019, which claims the benefit of U.S. Provisional Patent Application No. 62/639,843 filed Mar. 7, 2018 entitled "Adsorption-Based Heat Pump", each of which is incorporated by reference herein in its entirety.

TECHNICAL FIELD

This invention relates to adsorption-based heat pumps and also to methods of desalination using the adsorption-based heat pumps.

BACKGROUND

Adsorption-based heat pumps (or simply "adsorption heat pumps") are often used as, or as part of, an adsorption refrigeration/cooling/heating system. A typical adsorption heat pump mainly includes a solid adsorbent bed, an evaporator and a condenser. An adsorption system benefits from attractive force between the adsorbent and adsorbate (or refrigerant). The employed adsorbent-adsorbate is called the working pair. An adsorption phenomenon is called physical adsorption where the attractive force between the working pair is of the Van der Waals' type. Alternatively, in chemical adsorption, a chemical reaction occurs between the working pair. Some typical working pairs are activated carbon-methanol, activated carbon-ammonia, zeolite water, silica gel-water, calcium chloride-ammonia. The employed working pair affects the temperature range and efficiency of the adsorption system. Furthermore, composite adsorbents can be employed to enhance heat and mass transfer or increase adsorption quantity.

The operation of an adsorption heat pump can be described in the following steps: Firstly, heating the adsorbent bed increases the pressure and temperature of the working pair. Secondly, further heating the adsorbent results in desorption. The desorbed refrigerant vapour conveyed to the condenser where heat transfer from refrigerant results in liquefaction. Thirdly, the adsorption bed is disconnected from the condenser. Thus, cooling the adsorbent reduces the temperature and pressure. Fourthly, the condensed refrigerant in the evaporator starts evaporation at low pressure and temperature. Since the evaporator is connected to the adsorbent bed, the solid adsorbent in the adsorption bed attracts the refrigerant vapour from the evaporator, thus helping to reduce the pressure and the temperature of the refrigerant.

Different designs for the abovementioned cycle have been suggested. These designs attempt to increase the efficiency and practicality of the system. The factors that distinguish these different adsorption system designs are continuous versus intermittent operation, the heat and/or mass recovery method, the heat and mass transfer enhancement method, the use of low grade or green heat source. Two important parameters that should be considered in a refrigeration system are its coefficient of performance or COP which is the ratio of cooling capacity to the supplied heat, and specific cooling power or SCP which is the ratio of the cooling capacity to adsorbent mass.

One common feature in the adsorption devices is that the adsorbent is fixed in a unit or bed and the flow and circulation of refrigerant carries out the cycle. The earliest adsorption systems only employed a single adsorbent bed, and therefore they could only operate in an intermittent cycle.

The later designs took advantage of two or multiple beds to provide continuous cooling and enhance COP and SCP (Yonezawa et al. U.S. Pat. No. 4,881,376) (Yonezawa, Y., et al. U.S. Pat. No. 5,024,064) (Sato, Tanaka, Honda, Fujiwara, U.S. Pat. No. 5,775,126). In these designs one adsorbent-bed is active while others are inert. By swapping between the adsorbent beds, the refrigeration can continue operating without any long interruption.

The use of multiple beds also facilitates the recovery of the thermal energy from inert beds. Several designs have been suggested that enables and enhances the heat recovery. One technique is based on generating a temperature gradient in the adsorbent bed that is also called thermal wave (Shelto, U.S. Pat. No. 4,610,148) (Tchernev, U.S. Pat. No. 4,637,218). Another method suggests the use of forced convection of the refrigerant for heating and cooling the adsorbent. This method is called forced convective thermal wave cycle (Critoph, and Thorpe, U.S. Pat. No. 5,845,507). However, there are major challenges in the implementation of this method under vacuum.

Another design is based on a set of rotating adsorbent beds to facilitate heat recovery (Ebbeson, U.S. Pat. No. 5,431,716) (Critoph, U.S. Pat. No. 6,629,432). Additionally, some designs take advantage of multiple beds and by controlling a heat transfer medium between the adsorbent beds exploit the stored heat in the desorbed bed and preheat the adsorbed bed (Paulussen, US 2011/0167842). Similarly, a temporary heat store medium can be employed to recover the thermal energy (Sommer, and Dassler, US 2014/0298832). There are variety of designs with multiple fixed adsorbent beds that facilitates heat transfer (Mittelbach, US 2011/0138824) (Garner, US 2014/0033760 A1) (Dassler, Mittelbach, WO 2015/014772).

More heat recovery can be achieved from the condenser as well. Another efficient approach is to employ a hybrid system in which an adsorption system is combined with another refrigeration system such as vapour compression cycle. Alternatively, two different adsorption cycles were combined where the waste heat of high-temperature cycle was employed to drive the low temperature cycle (Akisawa, US 2009/0095012).

Furthermore, there are numerous prior-art references disclosing the use of low-grade heat or solar energy as a heat source.

An improved adsorption-based heat pump that overcomes at least some of the foregoing issues is therefore highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, this invention relates to a new type of adsorption-based heat pump which takes advantage of enhanced heat and mass transfer of adsorbent/desiccant by means of mixing and convection mechanisms.

A major problem in an adsorption-based heat pump is the heat transfer to and from adsorbent/desiccant during desorption and adsorption cycle. Traditionally, desiccant is sprayed on a bed of conductive metal to increase its conductive thermal properties. There are three forms of heat transfer: conduction, convection and radiation. Instead of relying solely on conduction, the embodiments of the invention provide a mechanism to also exploit convection (and also radiation) to warm and/or cool the adsorbent/desiccant.

According to one aspect of this invention, an adsorption refrigeration system comprises at least one evaporator, at least one desorber, at least one condenser and at least one powder (granule) cooling apparatus. In some of the described embodiments here, the adsorbent powder or granules are not stationary or fixed in a bed but transported between the evaporator, the desorber and the cooling apparatus.

More particularly, the solid adsorbent is transported via transporting means such as a screw conveyor, equivalent powder-displacing device or in some cases even by gravity.

According to another aspect of this invention, employing screw conveyors (or functionally equivalent mechanisms) not only facilitate the transportation of the adsorbent powder, but also help with mixing the adsorbent, thus enhancing the heat and/or mass transfer. Changing the heat transfer regime of the adsorbent from pure conduction to a combination of conduction, convection and radiation is one aspect of this invention.

Furthermore, since the heat transfer effects are not limited by the attributes of a specific powder or adsorbent, the method can readily be applied to different adsorbents. The mixing and convection factor is effective in both cases of physical adsorption or chemical adsorption. Therefore the present method is powder-agnostic.

According to another aspect of this invention, passing the adsorbent powder or granules throughout a heat exchanger enhances the heat transfer. The heat exchanger can be composed of plurality of pipes, tubes or conduits with a heat-transfer fluid flowing through them and powder pouring and passing over and around the pipes. Alternatively, the heat exchanger can include fins and plates connected to heat sinks where the heat sinks transfer the heat to the outside medium. Unlike the prior-art heat exchangers in the sorption industry, in the present heat exchanger as depicted by way of example in FIG. 1, the powder (or granules) falls down and moves through the narrow passages of fins, plates or pipes. The movement of powder (or granules) is designed so that hot powder and cold powder mix and also change its location relative to a cold/hot plate. This mixing and movement breaks the temperature profile of the powder and hence facilitates the desirable convection effects. Therefore, employing bulk solid heat exchangers in the desorber part or cooling apparatus can enhance the practicability of the system.

According to another aspect of this invention, mixing the adsorbent powder or granules with a rotating mixer blade enhances the heat transfer. Therefore, employing a rotating (or a reciprocating) mixer in the desorber part or cooling apparatus can enhance the practicability of the system.

According to yet another aspect of this invention, an open cycle of this heat pump can be used for water desalination applications. In a method of desalination, water (or a salt-carrying liquid) with low or high concentrations of dissolved minerals can enter the evaporator where water evaporates and adsorbs on the adsorbent. Then, in the desorber, the water will be evaporated and then condensed. This technique enables a non-contact (contactless) desalination process by which water or liquid with high impurity can be desalinated. The cycle can work under different pressures whether vacuum or positive pressure.

Other inventive aspects of the disclosure may become apparent from the detailed description and drawings.

BRIEF DESCRIPTION OF THE DRAWINGS

Embodiments will now be described, by way of example only, with reference to the drawings, in which.

DETAILED DESCRIPTION OF EMBODIMENTS

Figure 1:
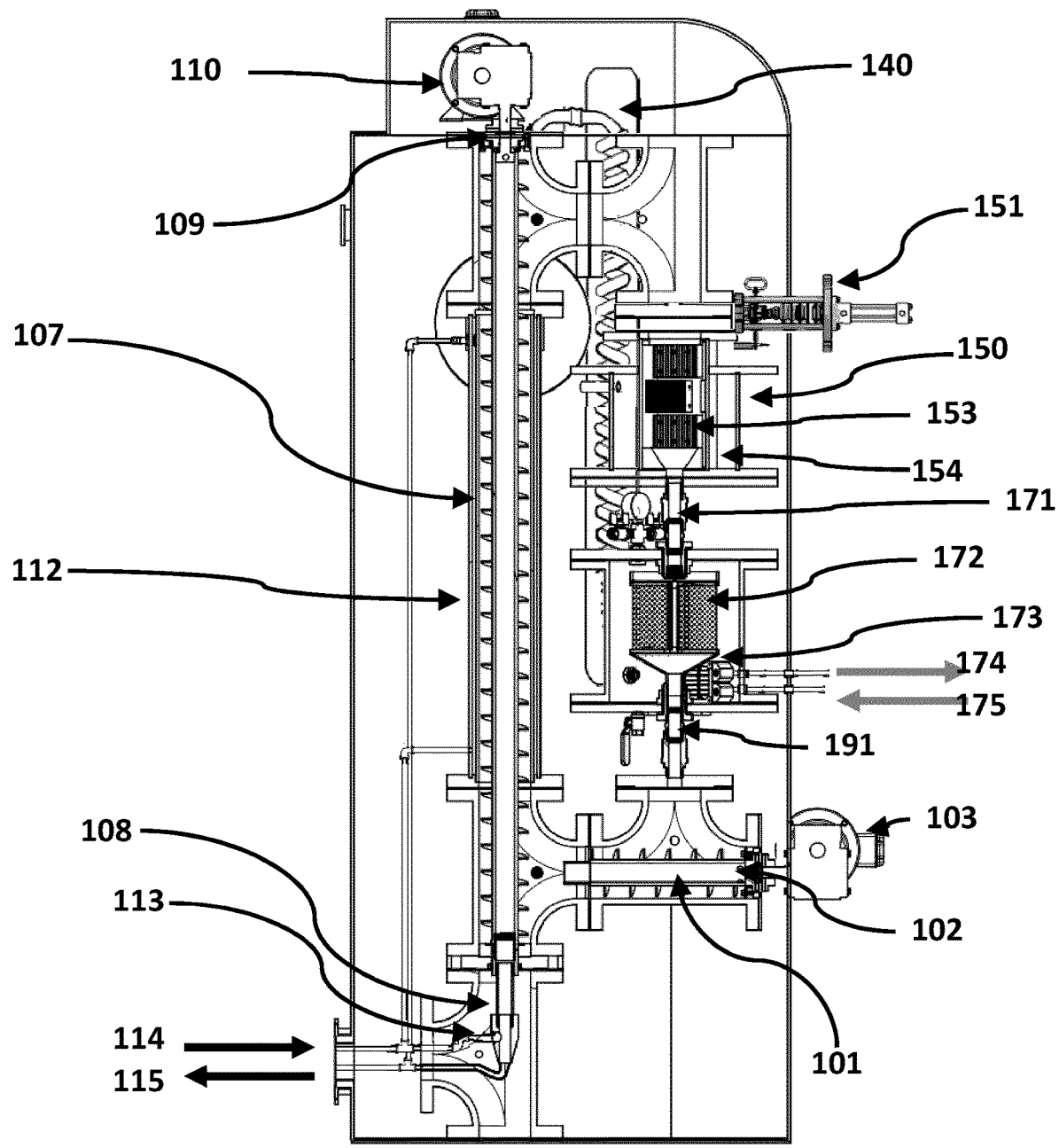
FIG. 1 illustrates an adsorption refrigeration system comprising a desorber, a powder cooling heat exchanger, an evaporator and a condenser in accordance with one embodiment of the present invention.
Figure 2:
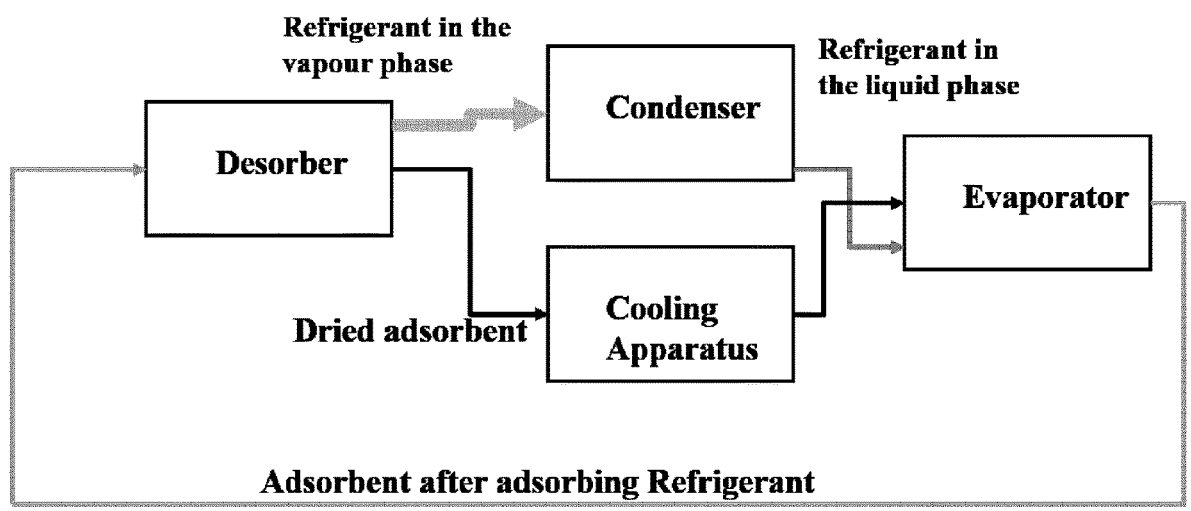
FIG. 2 is a diagram illustrating the transport of material, adsorbent and refrigerant in the different parts of the refrigeration system of FIG. 1.

An adsorption-based heat pump system is a mechanical system that facilitates an adsorption process for the purpose of refrigeration, cooling or heating. The embodiment illustrated by way of example in FIG. 1 comprises at least one evaporator, at least one desorber (adsorbent heating apparatus), at least one adsorbent cooling (heat dissipation) apparatus and at least one condenser. The illustrated embodiment employs an adsorbent transporting and/or mixing mechanism (e.g. screw conveyors) and/or powder mixers and/or agitator and/or powder heat exchangers to transport the adsorbent and/or to enhance heat and/or mass transfer. Therefore, it can provide an efficient adsorption refrigeration or heat pump. FIG. 2 schematically depicts the main functional elements underlying the system of FIG. 1. As depicted in FIG. 2, the system includes a desorber, a condenser, a cooling apparatus and an evaporator and a transport means (e.g. screw conveyor) for transporting adsorbent from the evaporator to the desorber.

In the example embodiment illustrated in the figures, a silica gel-water pair has been employed. Other adsorbent-adsorbate working pairs can readily be used in this system. Some examples are zeolite-water, MOF (metal-organic-framework)—water and activated carbon-methanol. Nano-porous materials have a regular organic or inorganic framework supporting a regular, porous structure with pore sizes in the range 100 nanometers or less. Some examples of nano-porous materials are zeolites, activated carbon and MOFs. However, the working temperatures will change accordingly. Although one embodiment of the invention has been illustrated in FIG. 1, it will be appreciated that other mechanisms, systems or arrangement of parts can also provide the same or substantially similar mixing and/or convection effects to enhance the heat transfer and/or mass transfer to and from the adsorbent powder or granules. In the example embodiment shown in FIG. 1, the saturated adsorbent powder is transported and mixed in the desorber using two screw conveyors 101, 107. The first screw conveyor 101 drives the powder forward, e.g. substantially horizontally in this particular mechanism. This first screw conveyor 101 is driven by a first motor, e.g. an electric motor 103 via a coupler 102 or by any other equivalent or suitable drive means. The coupler 102 between the motor 103 and the first screw conveyor 101 can be a sealed shaft torque coupling of any suitable type to facilitate maintaining the vacuum pressure inside the desorber. The second screw conveyor 107 is part of the desorber unit. In the particular mechanism depicted in FIG. 1, the second screw conveyor 107 is substantially vertical, i.e. orthogonal to the first screw conveyor 101. However, embodiments may utilize other orientations or geometries for the first and second screw conveyors. In the desorber unit, the wet adsorbent powder is heated to separate the refrigerant from the adsorbent powder. The heating procedure can be performed by hot fluid circulation as described herein or by using other suitable heating methods. The second screw conveyor 107 not only mixes and transports the powder, but helps with heating the powder due to the inside hot fluid circulation 108. In the bottom of the second screw conveyor 107, a sealed fluid circulation apparatus (e.g. a device having a mechanical seal) 113 provides the inlet and outlet passages of hot fluid while permitting the second screw conveyor 107 to rotate freely. The hot fluid inlet is connected to a pipe, tube or conduit that transports the fluid to the top of the second screw conveyor 107. The hot fluid outlet provides a passage around the pipe. Due to the sealed bearing of the fluid circulating apparatus, the fluid outlet does not interfere with the rotation of the screw conveyor. The second screw conveyor 107 is connected to a second motor e.g. a separate electric motor 110 via a sealed shaft torque coupling 109. The use of separate first and second motors for the first and second screw conveyors enables independent and precise control of the flow and mixing of the adsorbent. If only the second screw conveyor 107 in the desorber rotates, it can still provide mixing without conveying the powder to the outlet. The outside tube with its hot fluid circulation 112 also contributes to the heating of the adsorbent. The hot fluid can be water at, for example, 75° C. that enters as inlet fluid 114 and circulates in the outside tube and/or inside the second screw conveyor 107 and exits from the outlet pipes as outlet fluid 115. Experiments show that in the experimental apparatus shown in FIG. 3 the powder can reach 65° C. in a few minutes. As will be described below, the hot fluid may be circulated inside, outside or both inside and outside, although the different arrangements will affect the performance of the desorber. It should be added that the hot fluid circulating inside the screw conveyor and the hot fluid circulating in the outer jacket can be the same fluid or different fluid. For instance, in some embodiments the fluid circulating in the outer jacket can be a hot gas and the fluid circulating inside the screw conveyor can be a hot liquid. In the top of the desorber, there are orifices that convey the water vapour to the condenser 140. In the condenser, the water vapour is liquefied. The cooling in the condenser 140 can be performed using ambient air blown by a fan or by using cold water or any other suitable type of fluid circulation on the outer surface of the condenser. The condensed water is transported to the evaporator through a water inlet pipe that passes through an expansion valve or capillary tube. The exiting hot powder from the desorber can fall down through the cooling apparatus 150 by opening the valve 151. Although illustrated in this embodiment, it should be understood that this valve is not a necessary part of the design. Without this valve the desorbed powder is directly conveyed to the cooling apparatus.

Figure 4:
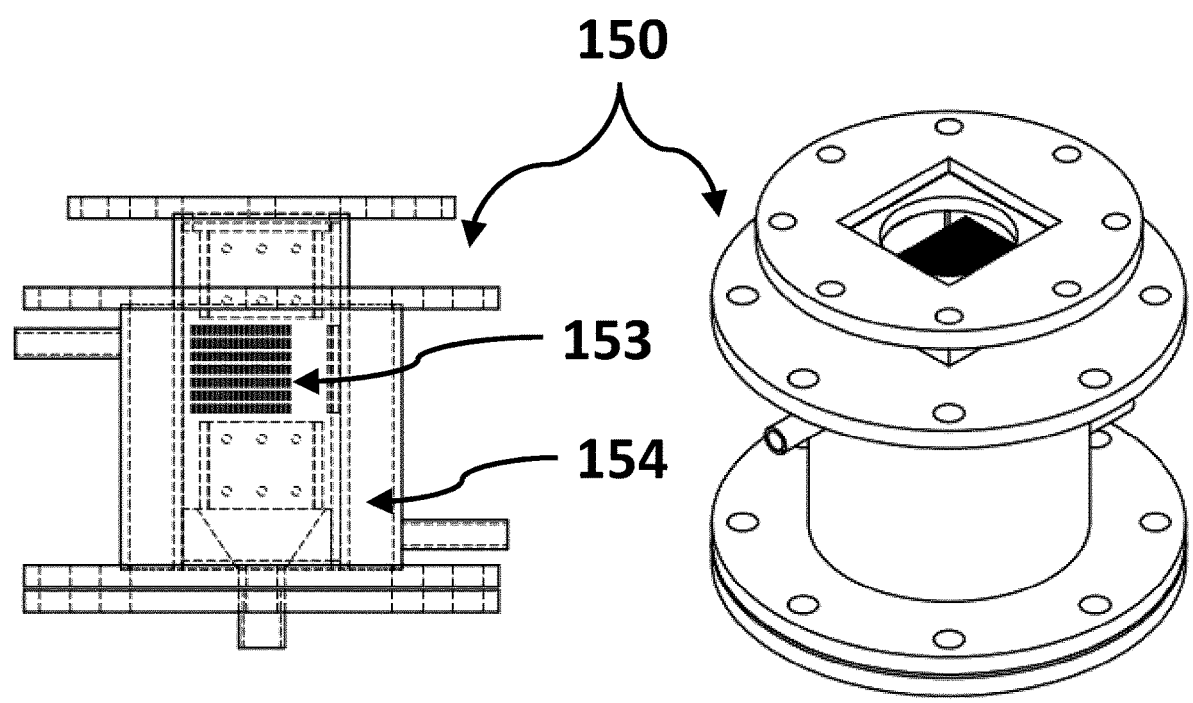
FIG. 4 illustrates a powder (or granule) cooling apparatus having heat exchanger plates with staggered passages through which cooling fluid is circulated.
Figure 5A:
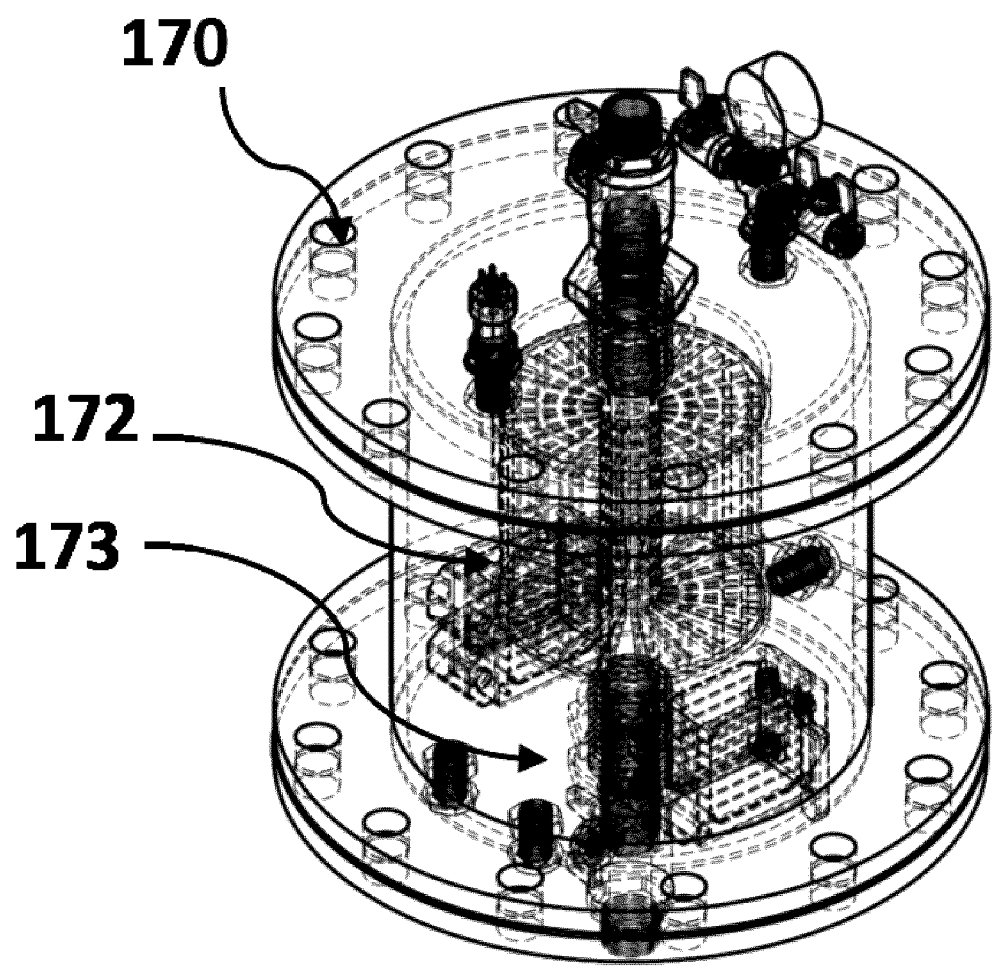
FIG. 5A is an isometric partially transparent view of an evaporator having an adsorbent container with a mesh around it to expose the adsorbent to the vapour and heat exchangers to outwardly transfer the cooling effect.
Figure 5B:
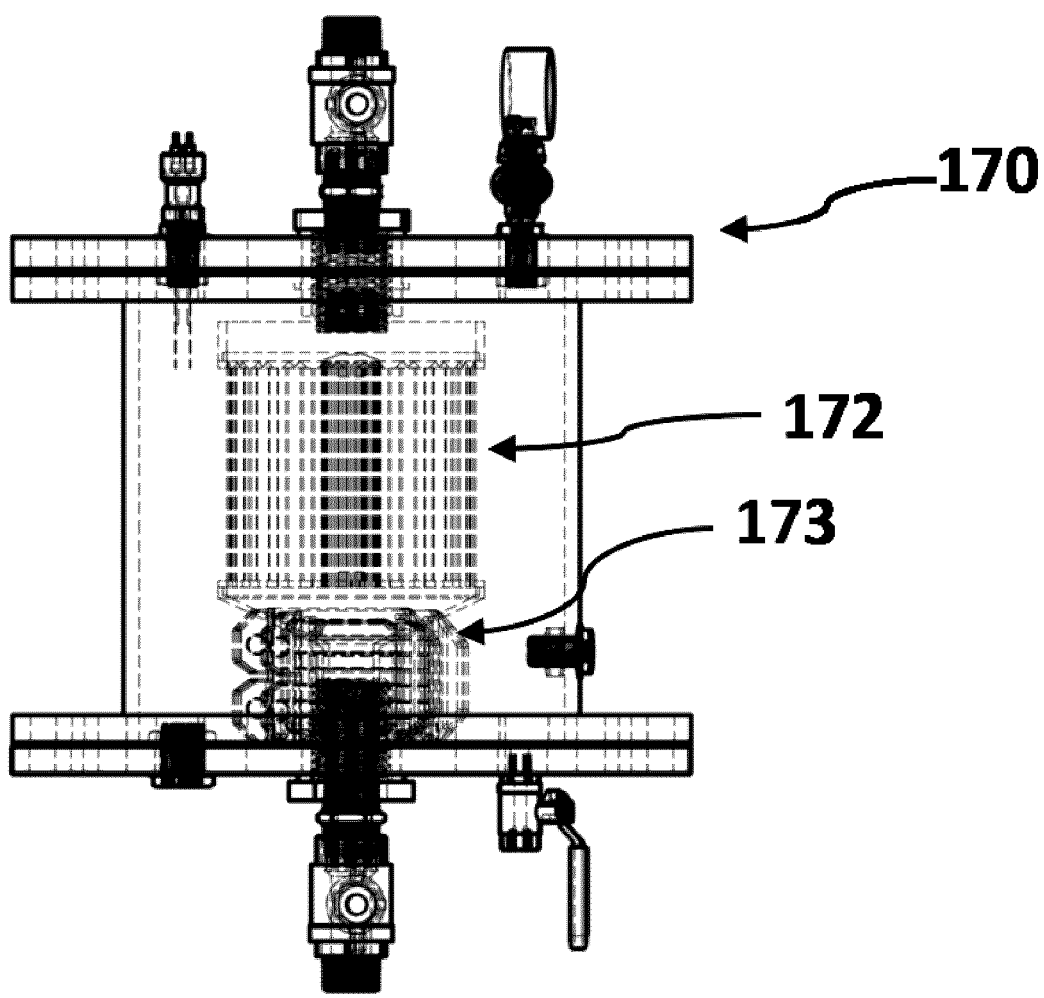
FIG. 5B is a side view of the evaporator of FIG. 5A.
Figure 5C:
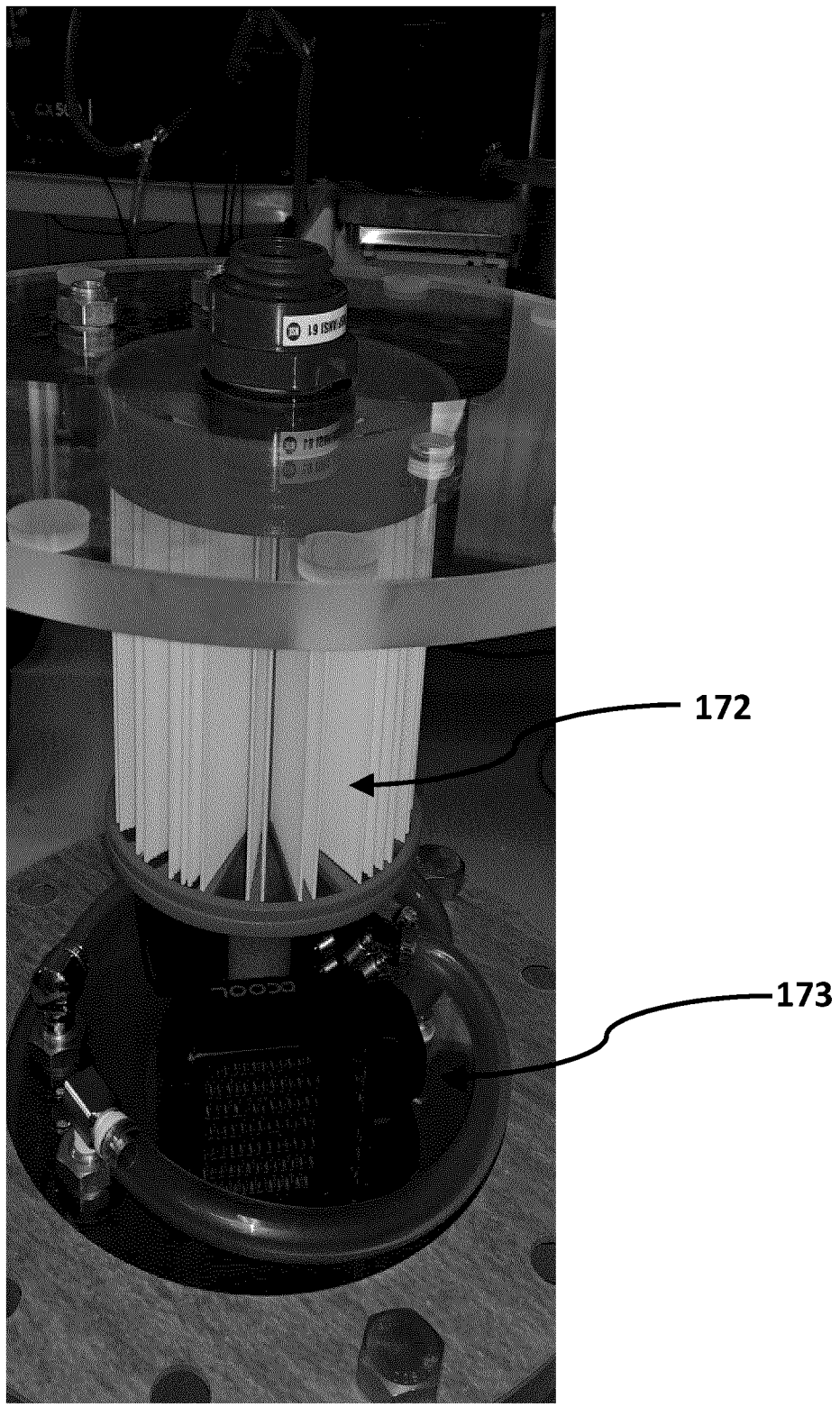
FIG. 5C is a photograph showing the inside of the evaporator, the adsorbent container and heat exchangers.

As also shown in FIG. 4, the cooling apparatus 150 is a heat exchanger designed for cooling powder and bulk solids via conduction and convection. The powder is moved and mixed over the surface of the heat exchanger fins 153 or pipes and transports thermal energy to the cooling fluid (e.g. water) 154 circulating around the heat exchanger. As shown in FIG. 1, and also in FIGS. 5A and 5B, the cooling apparatus stores the powder, and by opening the valve 171 above the evaporator, the cold powder drops into the evaporator powder container 172. The evaporator comprises a powder container, a refrigerant (e.g. water) inlet from the condenser, heat exchangers, and a funnel that collects the powder. The powder container has an extensive surface area covered with a fine mesh and/or holes that exposes the adsorbent powder to the vapour in the evaporator. The powder container can have different shapes. However, an optimal shape of the powder container is the one that has maximum surface area per given volume. In this example embodiment, rectangular prisms that are separated with small gaps, to allow vapour exposure, are used. Depending on design specifications and the working pair, the powder container can be made from either thermally conductive materials (e.g. aluminum or copper) or materials with poor thermal conductivity (e.g. plastics) to manage the powder temperature within it. The funnel is located below the powder container and collects the adsorbed powder. The closed area around the funnel separates the powder from liquid water. Therefore, the water surface is always controlled to be below the funnel level and does not directly contact the adsorbent. In a short time, the powder adsorbs a large amount of vapour and therefore evaporation continues on the water surface and adsorbs the heat from the heat exchangers 173. The cooling effect can be conveyed outside the unit via cooled water (or other conveying fluid). The inlet 174 and outlet 175 of the cooling effect conveying fluid is shown in FIG. 1. After adsorption slows down due to saturation, a valve 191 opens to dump the saturated powder into the desorber. Here again the first screw conveyor 101 pushes the powder forward and the cycle can thus operate continuously.

It should be clarified that, the screw conveyor with heating/cooling fluid circulation and jacketed trough may also be called a thermal screw processor. Additionally, the thermal screw processor may have hollow flights that heating/cooling fluid passes through them. Optionally, the screw conveyors may have a suitable coating, e.g. a magnesium coating.

It should be added that in some embodiments the outer wall of the desorber can be replaced with a transparent wall to accommodate radiation heat transfer from focused solar radiation. Alternatively, other types of electromagnetic radiation such as microwave radiation can be employed to enhance the desorber's heating.

Figure 3:
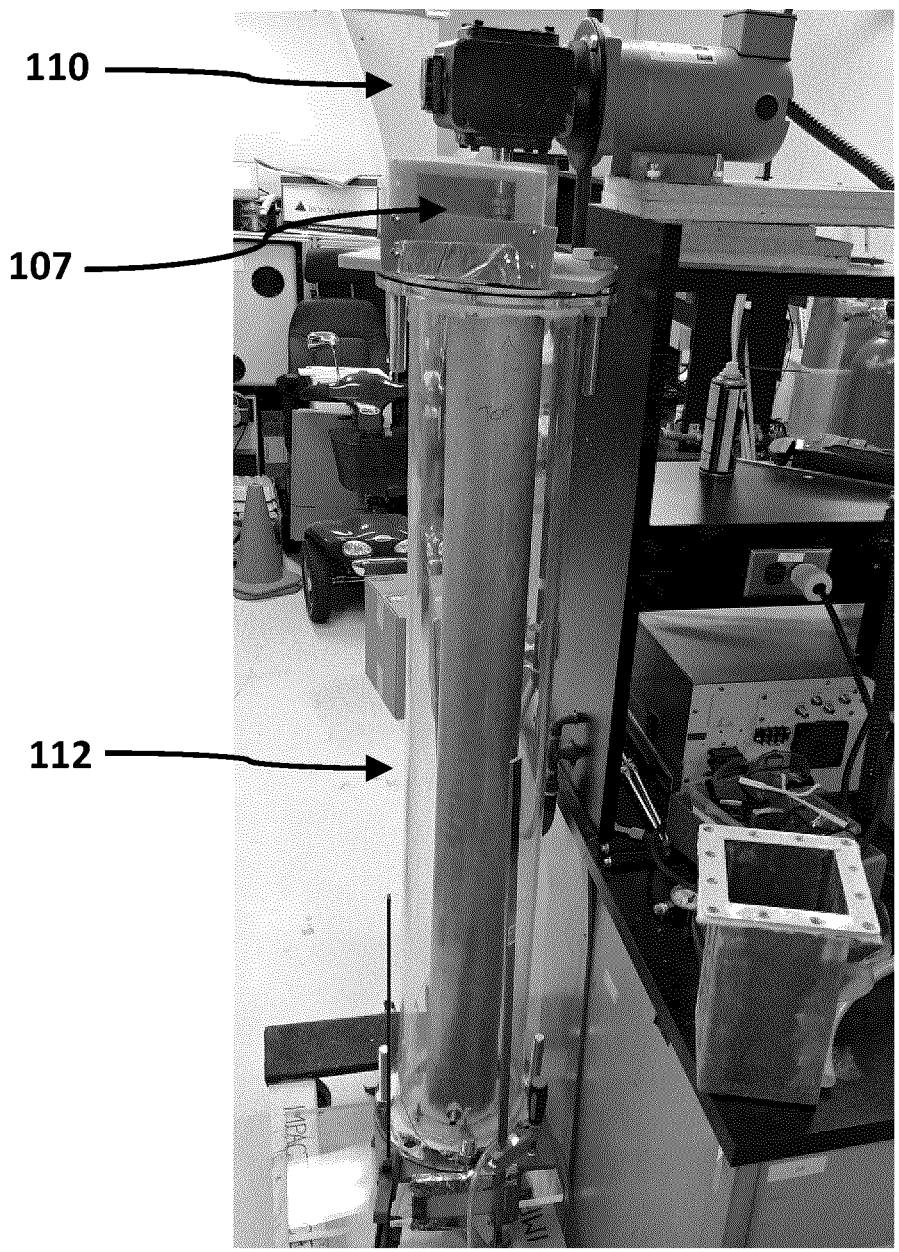
FIG. 3 is a photograph showing an experimental desorber employed in testing.
Figure 6:
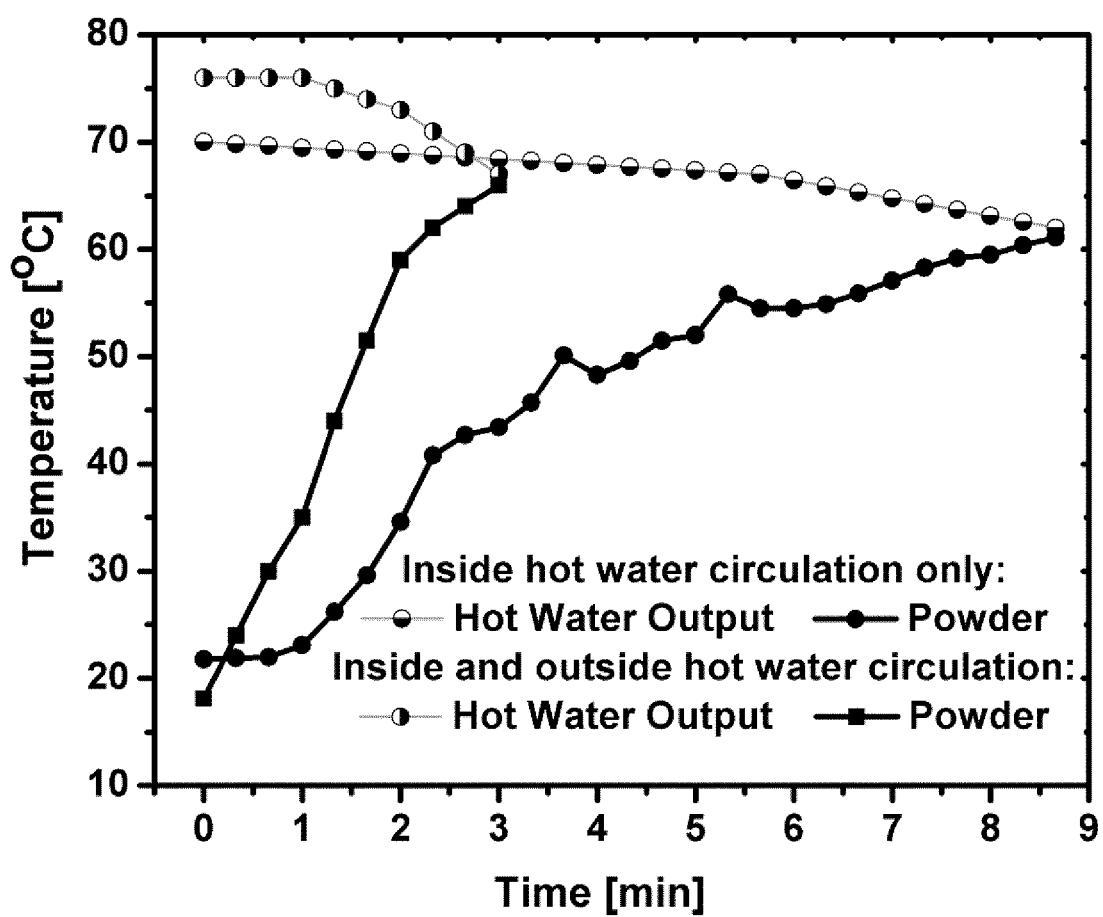
FIG. 6 is a graph that plots measurements of the desorber's output hot water temperature and powder temperature versus time for a first case in which hot water circulates both inside an aluminum screw conveyor and outside an aluminum tube and for a second case in which hot water only circulates inside the aluminum screw conveyor.

Example Measurements of the Modules of a Prototype Adsorption Refrigeration System:

The desorber was tested to measure the required time for heating. The desorber was made of a 5' long and 4" diameter aluminum tube (FIG. 3). An aluminum screw conveyor occupied part of the volume and the remaining volume inside the tube was filled with 4.2 kg of fine silica-gel powder. A water heater was used to heat the water to around 75° C. The screw conveyor was rotating at a speed of ~20 rpm. The output water temperature and powder temperature were measured for two cases: first, when the hot water only circulated through the screw conveyor and another case when, in addition to the inside loop, the hot water also circulated outside the aluminum tube. Temperatures versus time are shown in the graph in FIG. 6.

A series of measurements were conducted on the cooling module to test the suitability of different configurations of powder heat exchangers or mixers.

Figure 7A:
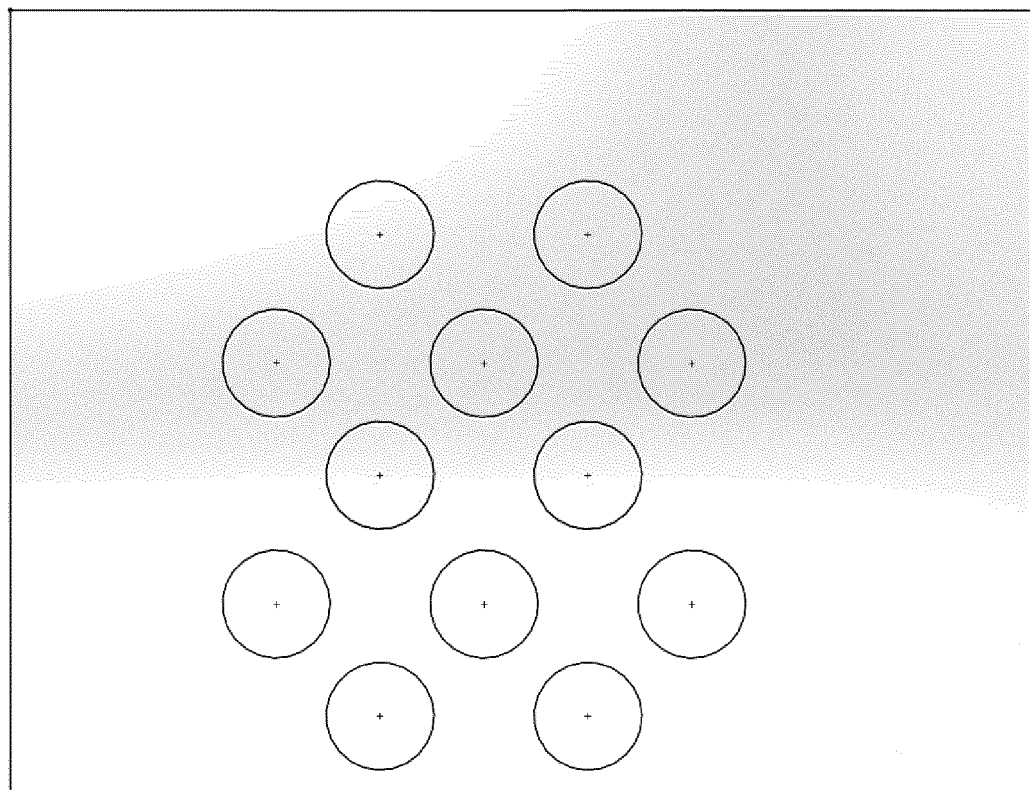
FIG. 7A schematically depicts an arrangement of staggered pipes in the powder heat exchanger.
Figure 7B:
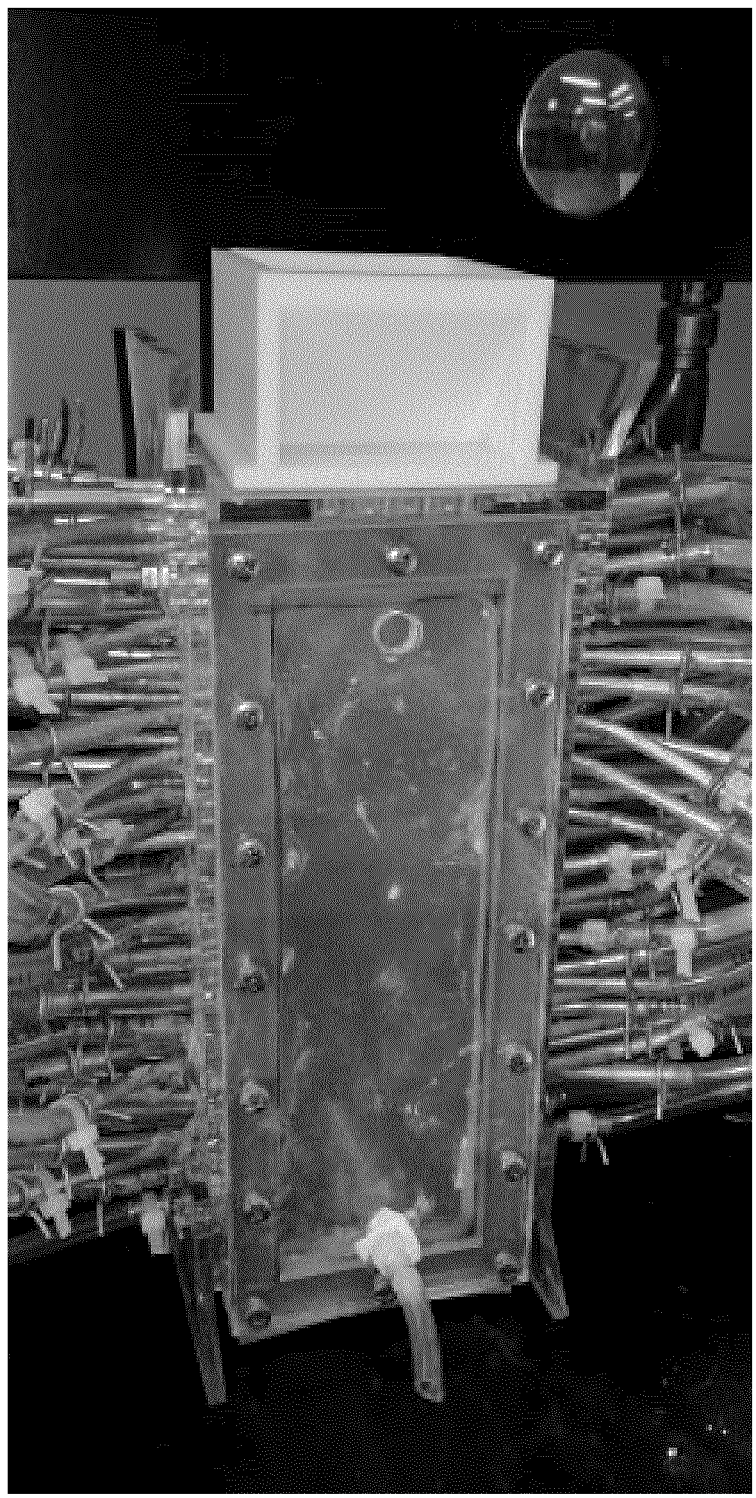
FIG. 7B is a photograph showing an experimental powder heat exchanger.

In one set of experiments, a pipe heat exchanger was designed with 176 copper pipes (¼" pipe) arranged in a staggered form (as shown by way of example in FIG. 7A) to enhance convection heat transfer. Tap water (at a temperature of 21° C.) circulated in the pipes and around two walls of the cooling apparatus (as shown in FIG. 7B). A quantity of 500 g of silica gel powder was located on a funnel on the top of the apparatus and, by opening a valve, the powder fell and mixed through the staggered pipes in the heat exchanger. The average discharge rate of powder was 6.25 g/s (500 g discharged in 80 s). The powder temperature was initially 80° C. After passing through the 12" long heat exchanger, the water temperature reached 40° C.

To estimate the effect of ambient air in the powder cooling process, the powder at the same temperature was poured from the same distance through the air. It was observed that the temperature dropped from 80° C. to 66° C. in this case.

Figure 8:
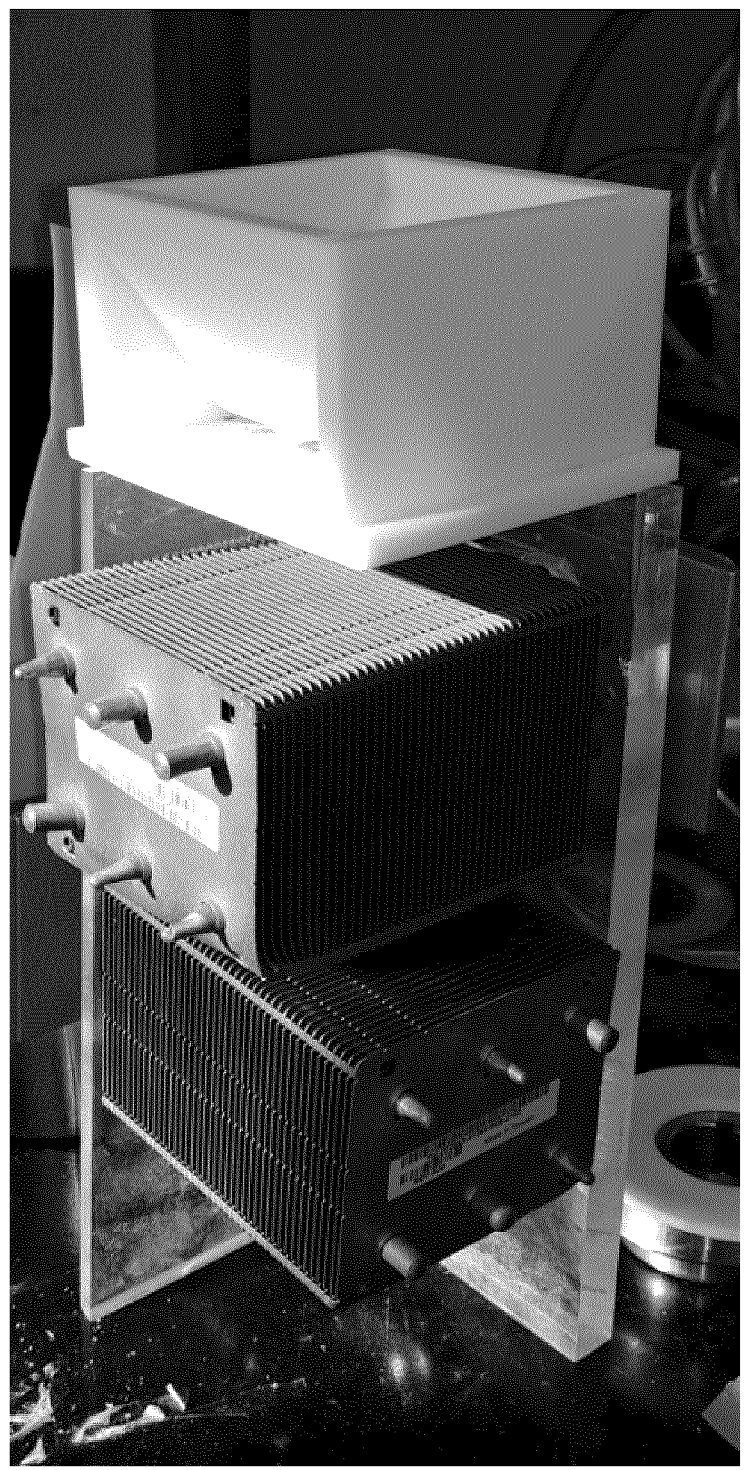
FIG. 8 is a photograph showing another experimental powder heat exchanger.

In another experiment, two computer heat sinks with the shape of plates were employed (as shown in FIG. 8). To enhance convection heat transfer, the heat sinks were installed perpendicular to each other so that hotter and colder powders exchange heat while passaging through the fins. The abovementioned funnel was used to provide a similar flow of powder. The powder was passed through the passages between the plates of the heat exchanger. The temperature of the heat sinks was controlled by contacting a cold surface. In one set of experiments, the powder temperature dropped from 78° C. to 43° C. by passing through 5"-long heat exchanger plates having an average temperature of 18° C. Similar experiments were performed in a vacuum set-up in which the powder temperature dropped from 71° C. to 41° C. while the average temperature of the plates was 16° C.

Another method of enhancing the heat transfer is using a mixer head in the powder. Experiments were performed to show the effectiveness of this method. A quantity of 500 g of powder was located in a stainless steel container and it was located in a larger container filled with water. The larger container also facilitated water circulation through its water inlet and outlet connections.

Different mixer heads such as stainless steel and plastic paint mixer heads as well as plastic screw conveyor (having a helical profile) were employed. It was shown that all of the mixer heads are very effective in enhancing the heat transfer.

Figure 9:
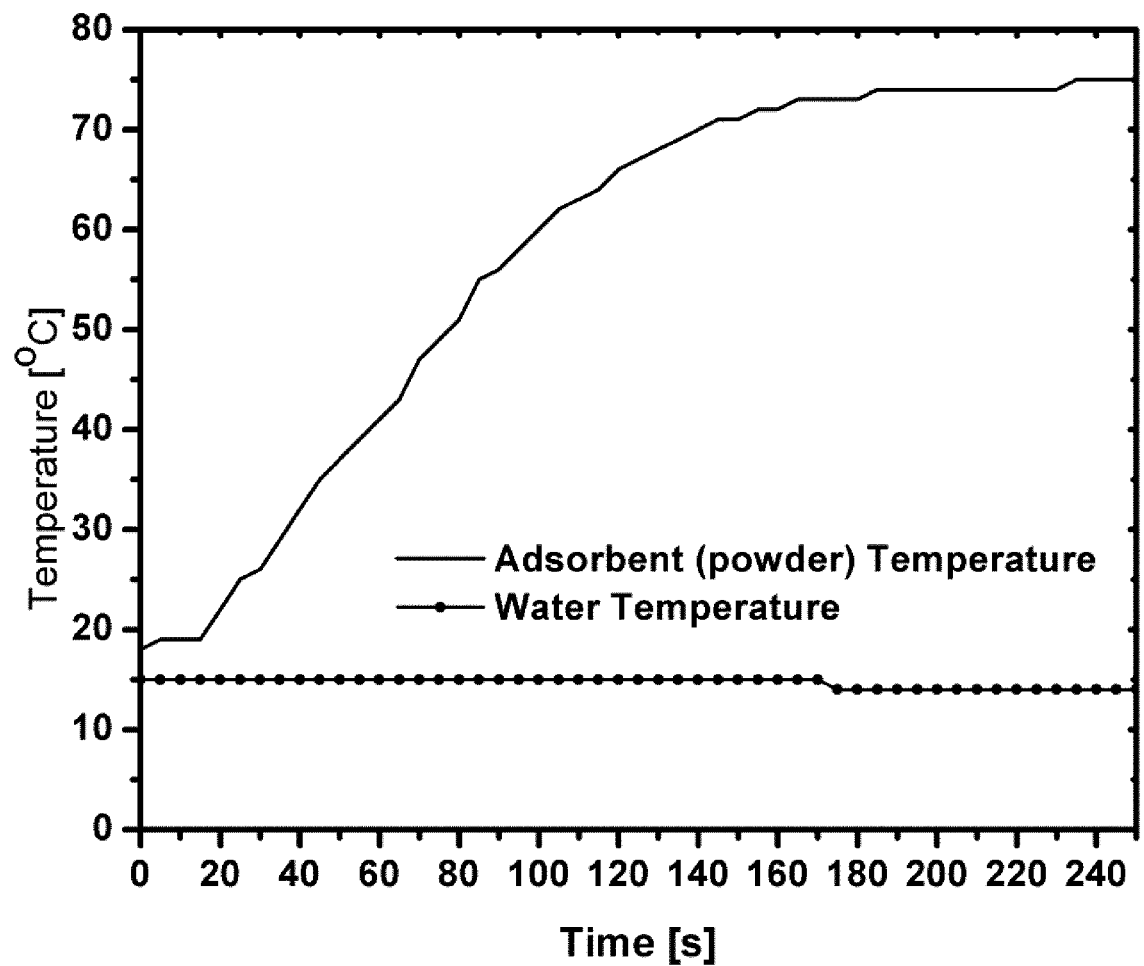
FIG. 9 is a graph that plots measurements of the evaporator under test, showing the powder (adsorbent) temperature and water temperature.

Also extensive experiments were performed on the evaporator part. Powder was desorbed in an oven and then cooled down to room temperature under vacuum. A container storing the powder was connected to the evaporator via a valve on the top of the evaporator. The evaporator was filled with water and then vacuumed. As mentioned before, the level of the water was low enough to make sure that there is no direct contact between the liquid and the mesh. By opening the connected valve, the powder started to fill the powder container inside the evaporator at which time the absorption process started. Water and powder temperature were recorded to demonstrate the evaporation and adsorption process. In one case employing 1.2 kg water and 696 g powder, in 5 minutes the temperature of water and powder changed from 30° C. to 24° C. and from 25° C. to 47° C., respectively. In another test employing 1 kg water, in 4 minutes the temperature of water and powder changed from 15° C. to 14° C. and from 18° C. to 75° C., respectively. FIG. 9 illustrates the change of temperature versus time for this case.

Figure 10:
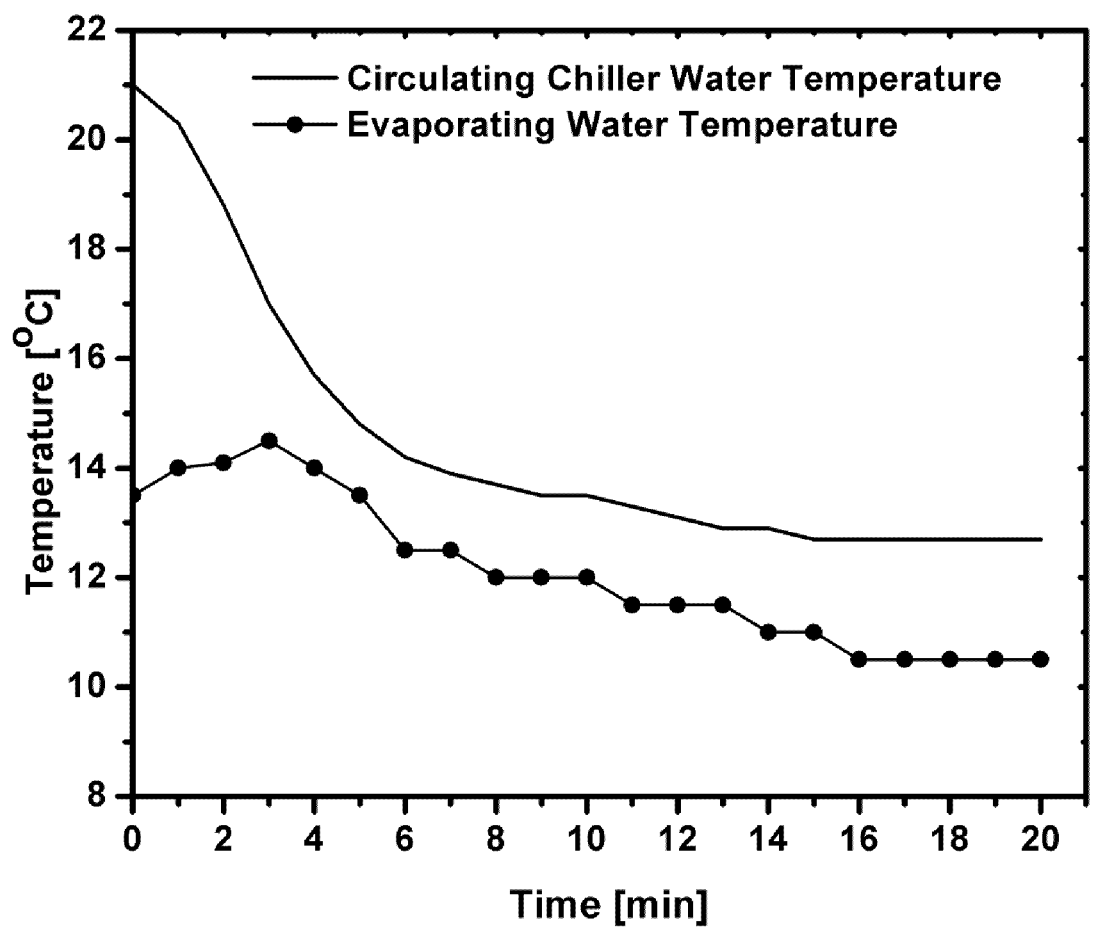
FIG. 10 is a graph that plots measurements of a full system test, showing the temperatures of water (refrigerant) inside evaporator and circulating water inside evaporator as powder adsorbs the vapor and generates cooling.

Finally, experiments were performed on the complete system, silica gel was desorbed by water at 75° C., and cooled down to 25° C., then conveyed into the evaporator. FIG. 10 shows the temperatures of chilling water inside the evaporator and circulating water inside evaporator as silica gel adsorbs the vapor, induces more evaporation and generates cooling.

Other embodiments can be devised using the inventive concept described herein to perform the same or substantially similar cooling adsorption cycle using mixers/screw conveyors/agitators to enhance the heat and mass transfer. Mixing and/or agitation induces convection heat and mass transfer to and from the adsorbent which is needed during different stages of the cycle. For the purpose of clarification, some examples are described herein. In one alternative embodiment the mixer or thermal screw processor do not transport the adsorbent powder/granules between different chambers. One or more chambers with identical mixing systems can be employed. In this embodiment, the heating and cooling fluids are circulating inside the mixer/agitator/screw conveyor for the purpose of heating and cooling, respectively. Therefore, the same chamber acts as the desorber and the cooling apparatus at different times. When the chamber operates as the desorber, heating fluid circulates through the mixer/agitator/screw conveyor and a valve connecting the chamber to the condenser is open and the valve connecting the chamber to the evaporator is closed. When the chamber operates as a dissipation (cooling) apparatus, cooling fluid is circulating through the mixer/agitator/screw conveyor (i.e. a mechanical device for acting on the adsorbent) and both the condenser and evaporator valves are closed. After, cooling down the powder, the evaporator valve is opened to let the cooled powder start the process of adsorption. The connection of the chamber to the evaporator is equipped with a mesh that prevents the powder from entering the evaporator while letting the vapor pass to the chamber. In this step the cooling fluid can continue circulating through the mixer/agitator/screw conveyor to enhance the adsorption rate. If the system comprises only one chamber, the same chamber operates alternately as the desorber and the cooling apparatus. If the system comprises two or more chambers, the system operates sequentially such that when a first chamber is desorbing, a second chamber is cooling the powder and an optional third chamber is connected to the evaporator. In one embodiment, the screw conveyor or auger or mixer stays stationary inside a container where the container rotates inside the chamber, therefore inducing mixing and convection.

Figure 11:
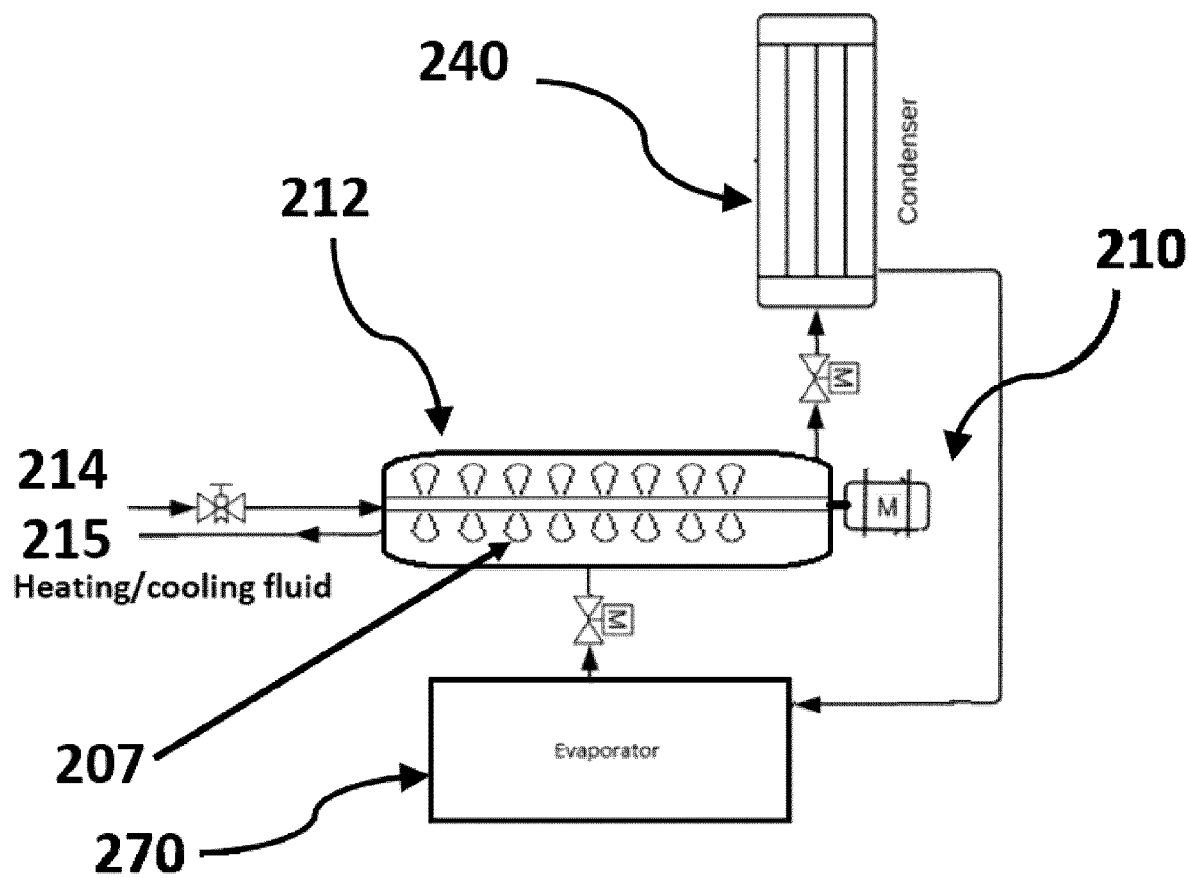
FIG. 11 illustrate an adsorption refrigeration system in accordance with another embodiment of the present invention.

FIG. 11 illustrates an adsorption refrigeration system in accordance with another embodiment of the present invention. The system depicted in FIG. 11 comprises a condenser 240, an evaporator 270, and a chamber 212. The chamber 212 is designed for alternately cooling and heating as well as alternately adsorption and desorption of the adsorbent. A mixer 207 or an agitator is driven by electrical motor 210 or any other source of mechanical torque. Heating or cooling fluid enters the chamber via inlet 214 and exits the chamber via outlet 215.

Furthermore, other embodiments can be used in which the desorber and/or heat dissipation (cooling) apparatus and/or powder basket part of the evaporator employ screw conveyors (e.g. thermal screw processors) for both transportation and enhancing heat/mass transfer. The screw conveyors could be arranged in an inclined position (angled orientation) to facilitate the transport of powder from one part to another. Furthermore, the dissipation (cooling) apparatus and the evaporator powder basket can be integrated into one unit where part of the screw conveyor acts as the cooling apparatus with cooling fluid circulating inside the screw conveyor and/or in the outer jacket and in the continuation of that the mixer/screw conveyor mixes the powder to enhance adsorption where the outer jacket partly (or totally) exposes the powder into refrigerant vapor from the evaporator. Alternatively, a separate evaporator system similar to the first described embodiment may be employed, where the evaporator is located between the heat dissipation (cooling) apparatus and the desorber, and powder can be unloaded from the cooling part into the evaporator and, after partial or full adsorption, unloaded into the desorber. Therefore, this arrangement might be implemented by using at least two inclined screw conveyors. The inclined screw conveyors may operate at angles of 45° or less, or in other embodiments one or more of the screw conveyors may operate at an angle larger than 45°. The advantage of using screw conveyors with angles of 45° or less is that there is no need for feeding conveyors. Therefore, for arrangements with screw conveyor angles larger than 45°, it may be required to employ horizontal feeding conveyors. Horizontal feeding conveyors can be readily added to the design, although it increases the cost of the product. There are other solutions available in the material handling industry to avoid the need for horizontal feed conveyor, such as employing smaller pitch sizes like short (⅔) pitch or half (½) pitch, or reducing the clearance between the screw conveyor and the pipe. These techniques can increase the efficiency of the material handling in inclined screw conveyors as well, and thus can be used in the described design.

The pipes/tubes of desorber and cooling (heat dissipation) part may have an outer jacket with fluid circulating to enhance the heat transfer. The condenser in this design is similar to the first design and collects the vapor from the top of the desorber, cools down the vapor via heat transfer to the ambient air and/or a cooling fluid, and transports the liquefied refrigerant to the evaporator. An expansion valve can be located between the condenser and evaporator to help reduce the pressure of the fluid. Furthermore, a low cracking pressure check valve can be located between the condenser and desorber.

It should be clarified that in the abovementioned design both the desorber and cooling part can use an identical design and size of screw conveyor as well as identical inclination angle or different angles/sizes. Therefore, some embodiments may use different designs and/or sizes of screw conveyor and/or different inclination angles.

As described different arrangements can be employed where the common aspect of all these designs is utilizing mixing and/or conveying (transporting) nano-porous material (adsorbent powder or granules) for the purpose of cooling or desalination.

Optionally, the system may be microprocessor-controlled by a computerized control system having a microprocessor, microcontroller, computer, programmable logic, etc. The system may optionally include a processor running machine-learning code. The processor may thus execute algorithms in code to provide an artificial intelligence (AI) capable of learning how to optimize the operations of the system based on feedback signals from one or more sensors. An AI-based control system can learn to adjust various operating parameters such as, for example, the rotation rates of the screw conveyors, the flow rate of refrigerant, actuation of valves, etc.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. An adsorption-based heat pump comprising:
a condenser to liquefy a refrigerant;
a cooling apparatus for cooling an adsorbent;

an evaporator for evaporative cooling using the adsorbent;

a desorber for separating the adsorbent and the refrigerant;

a first valve between the desorber and the cooling apparatus to allow the absorbent into the cooling apparatus after the absorbent has been separated from the refrigerant by the desorber; and a second valve between the evaporator and the desorber to allow saturated absorbent into the desorber, wherein the desorber comprises a first screw conveyor and a second screw conveyor, the first screw conveyor receiving the saturated adsorbent and transporting the saturated adsorbent to the second screw conveyor, the second screw conveyor transporting the saturated adsorbent while the saturated adsorbent is being heated to separate the adsorbent from the refrigerant such that the second screw conveyor delivers the adsorbent back to the cooling apparatus and delivers the refrigerant back to the condenser.

2. The adsorption-based heat pump of claim 1, wherein the desorber comprises an outer jacket for hot fluid circulation around the second screw conveyor.

3. The adsorption-based heat pump of claim 1, wherein the first screw conveyor is horizontal and the second screw conveyor is vertical.

4. The adsorption-based heat pump of claim 1, wherein the evaporator comprises a powder container.

5. The adsorption-based heat pump of claim 1, wherein the adsorbent is a powder.

6. The adsorption-based heat pump of claim 1, wherein the adsorbent is a nano-porous material.

7. The adsorption-based heat pump of claim 1 further comprising:

a third valve between the cooling apparatus and the evaporator to allow the absorbent into the evaporator after the absorbent has been cooled by the cooling apparatus.

* * * * *